July 19, 1927.
E. H. ALDEBORGH
1,636,543
ADJUSTABLE LIMIT PIN GAUGE
Filed Jan. 13, 1927
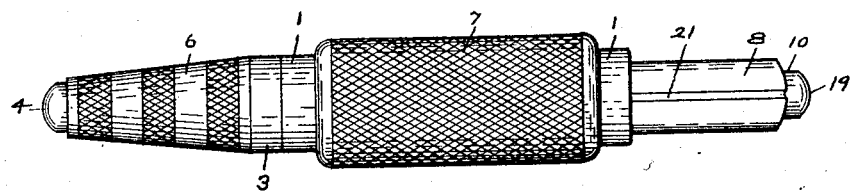
Fig 1
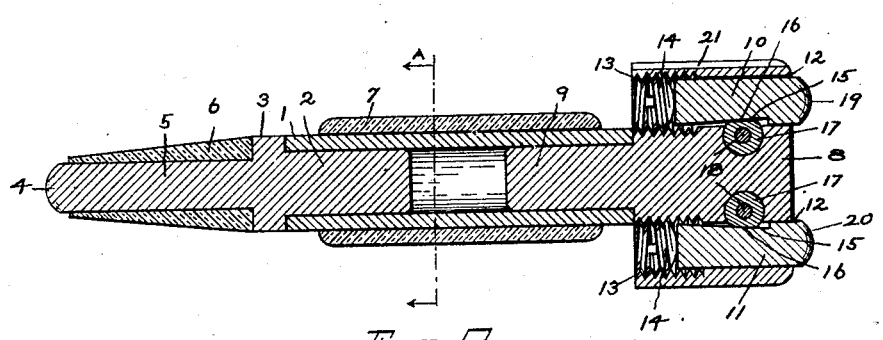
Fig 2
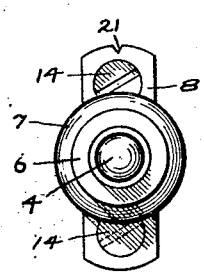  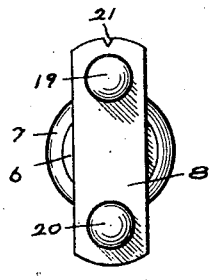  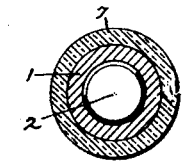
Fig 3    Fig 4    Fig 5
INVENTOR
Erik H. Aldeborgh
BY John J. Thompson
ATTORNEY Patented July 19, 1927.

1,636,543

UNITED STATES PATENT OFFICE.

ERIK H. ALDEBORGH, OF POUGHKEEPSIE, NEW YORK, ASSIGNOR TO STANDARD GAGE CO., INC., OF POUGHKEEPSIE, NEW YORK, A CORPORATION OF NEW YORK.

ADJUSTABLE LIMIT-PIN GAUGE.

Application filed January 13, 1927. Serial No. 160,983.

This invention relates to an adjustable limit pin gauge, of that class which is employed for the close measurement or checking of internal dimensions during the manufacture of a quantity of like parts, and where the limits of the measurement are held within fixed limits to what is known as a "go" and a "no go" dimension.

While this class of measurement is common in that kind of gauges known as "snap gauges", which are either formed with four pins or contact surfaces, which provide the two dimensions, or one contact surface which is common to both of the pins providing the two different dimensions.

It has not been possible to provide two different dimensions in one pin gauge, and it has required two separate pin gauges, one for the "go" and another for the "no go".

The object of the present invention is to provide a limit pin gauge, which shall in the one tool provide two separate measurements.

Another object being to provide means for quickly distinguishing between the two dimensions, both by sight and touch.

Still another object being to provide a gauge of this class that shall be simple, contain few parts, and be durable and efficient.

With these and other objects in view, my invention consists in certain novel construction and combination of parts as will hereinafter be fully described and claimed, and illustrated in the accompanying drawings which form a part hereof and in which like figures of reference refer to corresponding parts in all of the views, and it is to be fully understood that slight changes may be made without departing from the spirit of the invention.

In the drawings:—

Figure 1 is a front elevation of a gauge in which is embodied my invention.

Figure 2 is a vertical longitudinal sectional view showing the construction.

Figure 3 is an end view of the gauge looking at the single permanent pin.

Figure 4 is an end view of the gauge, looking at the two adjustable pins.

Figure 5 is a cross sectional view taken on the line A—A of Figure 1, in the direction of the arrows.

Referring to the drawings, the construction of the body and permanent end or pin, will require only a brief description, as this is the subject matter of another patent application, filed Oct. 4, 1926, Serial No. 139,566 and also the method employed for the adjustment and locking of the adjustable pins, will require only a brief description as this is fully described and claimed in the U. S. Patent No. 1,574,735 issued on Feb. 23, 1926, to J. B. Poloski, and assigned to Ford Motor Company, of Detroit, Mich., who have licensed the use of the same to the Standard Gage Co., Inc., of Poughkeepsie, N. Y., to whom applicant has assigned his interest in this invention.

As herewith shown, the device comprises a body portion 1, of steel or other suitable material and tubular in form with open ends.

In one end thereof is pressed or otherwise secured the shank 2 of the stationary plug or pin which is formed with the collar or flange 3 of the same diameter as the outside diameter of the body 1, against the end of which it is abutted; while the outer or pin portion 5 of the plug is of smaller diameter, and is formed with the rounded end 4, which may be hardened, ground and lapped.

On this pin portion 5 is provided a finger piece 6 of insulating material, not only to provide a finger grip but to protect the gauge as well.

The tubular body portion 1, is also protected with a finger grip or sleeve 7, of insulating material, which not only affords a grip by which the gauge is handled, but keeps the heat of the operator's hand from the body of the gauge.

The other or adjustable end of the gauge comprises a T-shaped head 8 which is formed with the shank 9 which is pressed or otherwise secured in the end of the body 1.

Said head 8 as will be seen by Figure 4, is rectangular and is provided with two adjustable pins 10 and 11, which are mounted in the parallel orifices 12 formed in said head 8 in parallel relation to the shank 9, and which are formed with the threaded portion 13, into which are threaded the set screws 14.

The pins 10 and 11 are formed with the flatted portions 15, which coact with the flatted portion 16 of the taper nuts 17 which are mounted in said head 8 in transverse relation to said pins and which are locked and drawn tight by the screws 18, all of which will be fully understood by reference to Patent No. 1,574,735.

The pin 10 is the no go pin, and when adjusted and locked forms a certain dimension between its end 19 and the end 4 of the permanent pin 5; and the pin 11 being the go pin will form a different dimension between its end 20 and the end 4 of the pin 5.

For providing a marking to quickly distinguish between the go and the no go pins, either by sight or touch, I have provided the surface of the head 8, adjacent to the pin 10 (no go) with a groove 21, which is provided with paint or enamel of a contrasting color such as red, that will be seen, while the groove will be felt by the operator, both indicating danger.

Having thus described my invention, what I claim as new and desire to secure by Letters Patent, is.

1. An adjustable limit pin gauge, comprising in combination with a tubular body portion having a stationary gauging pin mounted in one end thereof, of a head carried by the other end, said head provided with an adjustable go pin and an adjustable no go pin, each of which forms a predetermined dimension with the stationary pin.

2. In a limit pin gauge of the class described, and in combination with a tubular handle having one fixed gauge pin and two adjustable gauge pins, forming two different dimensions, of means comprising a contrasting color adjacent to one adjustable pin, for the purpose of distinguishing between said dimensions.

3. An adjustable limit pin gauge, comprising in combination with a tubular body portion having a stationary gauging pin mounted in one end thereof, of a T-shaped head secured in the other end thereof, said head provided with two adjustable gauging pins, in parallel relation with each other and said body portion.

4. An adjustable limit internal pin gauge, comprising in combination with a tubular body portion having a stationary gauging pin secured in one end thereof, of a T-shaped member secured in the other end thereof, two adjustable gauging pins mounted in said head in parallel relation to each other and to said body portion, one side of said head formed with an indicating groove to distinguish between said adjustable gauging pins.

In testimony whereof I hereunto affix my signature.

ERIK H. ALDEBORGH.